Patented Feb. 20, 1940

2,190,734

UNITED STATES PATENT OFFICE 2,190,734

ORGANIC SULPHONATED HYDROGENATED ABIETYL DERIVATIVES AND METHOD OF PRODUCING

Alfred L. Rummelsburg, Wilmington, Del., assignor to Hercules Powder Company, Wilmington, Del., a corporation of Delaware No Drawing. Application September 10, 1937, Serial No. 163,325

16 Claims. (Cl. 260—93)

This invention relates to organic salts of hydrogenated Rosinyl sulphonates and to methods for their production.

The method in accordance with this invention consists of sulphonating hydrogenated Rosinyl alcohol, or another hydrogenated Rosinyl derivative by treatment with a suitable sulphonating agent, and then reacting the hydrogenated Rosinyl sulphonate with an organic base. Thus, I may treat a hydrogenated Rosinyl alcohol with a sulphonating agent, such as, for example, sulphuric acid, sulphur trioxide, chlorsulphonic acid, acetyl sulphuric acid, etc., to produce hydrogenated Rosinyl sulphonate which is then reacted with an organic base. Again, I may react a hydrogenated Rosinyl halide with a sulphite, such as, for example, sodium sulphite, sodium acid sulphite, etc., and then react the resulting product with an organic base.

The organic base which I utilize may be, for example, heterocyclic nitrogen compounds, as, pyridine, quinoline, etc.; aliphatic amines, as, methylamine, ethylamine, triethylamine; aliphatic alkolamines, as, triethanolamine, etc,; aromatic amines, as, aniline, naphthylamine, ethyl aniline, etc.

The hydrogenated Rosinyl derivatives referred to herein and in the claims as suitable for sulphonation may be represented as $C_{19}H_{31}CH_2X$, $C_{19}H_{33}CH_2X$, or mixtures thereof, where X is OH, Cl, Br, or other functional group replaceable in sulphonation by the sulphate or sulphonate group. It will be understood that where X is an OH group, the derivative is a hydrogenated Rosinyl alcohol.

By the term "hydrogenated Rosinyl alcohol" is meant a primary alcohol obtained by the carboxylic reduction of a hydrogenated rosin acid, such as, for example abietic acid, sapinic acid, pimaric acid; a primary alcohol obtained by the simultaneous carboxylic reduction and hydrogenation of a rosin acid; or a primary alcohol obtained by the carboxylic reduction of a rosin acid and the hydrogenation of the alcohol so produced. The term "hydrogenated Rosinyl alcohol", includes within its scope, for example, hydrogenated abietyl alcohol, which may be dihydroabietyl alcohol ($C_{19}H_{31}CH_2OH$) or tetrahydroabietyl alcohol ($C_{19}H_{33}CH_2OH$) related to abietic acid ($C_{19}H_{29}COOH$). It also includes within its scope the corresponding hydrogenated sapinyl alcohol, which may be dihydrosapinyl alcohol or tetrahydrosapinyl alcohol related to sapinic acid, or mixtures of these alcohols; the hydrogenated pimaryl alcohol, which may be dihydropimaryl alcohol and tetrahydropimaryl alcohol related to pimaric acid, or mixtures of these alcohols; and the corresponding alcohols or mixtures of alcohols similarly related to the various other rosin acids.

Dihydro- and tetrahydroabietyl alcohols may be obtained, for example, by catalytic hydrogenation of alkyl abietates, or alkyl esters of wood rosin, crude or refined, or the corresponding hydrogenated esters, all as is more fully disclosed in the application for United States patent, Serial No. 604,859, filed April 12, 1932, by Irvin W. Humphrey, or by means of the action of sodium upon an alcohol solution of hydrogenated methyl or ethyl abietate according to the method described by Ruzicka and Meyer, Helf, Chim. Acta 5, 581–93 (1922) for the unhydrogenated abietates. The corresponding halides, as, for example, dihydroabietyl chloride and bromide, tetrahydroabietyl chloride and bromide, etc., may be produced by treating the alcohol with the desired hydrogen halide, as hydrogen chloride, hydrogen bromide, etc., or with phosphorous tri- or pentachloride, phosphorous tribromide, etc.

A method for the preparation of a hydrogenated Rosinyl alcohol may be illustrated by the following procedure in which hydrogenated abietyl alcohol is prepared by the catalytic reduction of hydrogenated methyl abietate:

One hundred twenty g. hydrogenated methyl abietate are placed in a pressure bomb equipped with electric heating, hydrogen inlet, agitator, and pyrometric secondary devices, 4 g. copper-chromium oxide catalyst are added and $H_2$ gas allowed to enter and leave several times in order to flush out oxygen. The bomb is then filled with hydrogen to a pressure of about 1720# sq. in. Electric heating and agitation is started and about 3 hours is required for the bomb to reach its maximum temperature of 275° C. As follows (typical run):

| Time | Temperature | Pressure, pounds |
|---|---|---|
|  | ° C. |  |
| 0 | 25 | 1720 |
| 1 hour | 175 | 2600 |
| ½ hour | 250 | 2920 |
| ½ hour | 270 | 2570 |
| ½ hour | 276 | 2390 |
| ½ hour | 276 | 2300 |
| ½ hour | 272 | 2280 |
| 1 hour | 275 | 2280 |
| 1 hour | 276 | 2210 |
| 2½ hours | 276 | 2240 |

Agitation and heating is stopped and the system allowed to cool to 25° C. The pressure is then #1000. The gas is bled off, and the product extracted with ether, filtered from catalyst, and the ether then evaporated. The product contains 89% hydrogenated abietyl alcohol.

The copper-chromium oxide catalyst used in the above procedure is desirably prepared according to the method described by Connor, Folkers and Adkins, J. A. C. S. vol. 54, pages 1139-40. The hydrogen pressure utilized may range from about 50 to 2000 atmospheres, and temperature from about 175° to 350° C.

The raw material for conversion to hydrogenated abietyl alcohol may, in place of hydrogenated methyl abietate, be wood rosin, esters of wood rosin, as methyl abietate, ethyl abietate, butyl abietate, propyl abietate, etc., abietic acid, abietic acid esters or other abietyl compounds containing a group reducible to the primary alcohol group, $CH_2OH$.

The various other hydrogenated Rosinyl alcohols may be prepared by the above procedure by the substitution of other types of rosin for wood rosin or by the substitution of the alkyl esters of other rosin acids for the alkyl abietates used in the above procedure. Thus, hydrogenated sapinyl alcohol may be prepared by substituting the alkyl sapinates, the alkyl esters of American gum rosin, for the alkyl abietates. Likewise, hydrogenated pimaryl alcohol may be prepared from the alkyl esters of pimaric acid, the alkyl esters of French gum rosin.

Other resin acids of similar structure may be employed or their esters, to synthesize various resin alcohols. If desired, the rosin prior to conversion may be partially distilled under reduced pressure separating a cut of say 5-15% to increase the resin acid content of the residue which accordingly will yield a hydrogenated Rosinyl alcohol of higher purity than the original rosin.

If desired wood rosin or one of the gum rosins may be refined prior to conversion, as by distillation under reduced pressure according to known procedures, and the distillate or one of its cuts used as the source of hydrogenated Rosinyl alcohol. The rosin may also be given a prior refining by crystallization from a suitable solvent or by washing in solution, as gasoline, with a substantially immiscible selective color-body solvent, as, furfural, phenol, methyl thiocyanate or ethyl thiocyanate, for the removal of color-bodies and other impurities.

The hydrogenated Rosinyl alcohol may be purified, if desired, by means of fractional distillation at reduced pressure, distilling off a preliminary cut of say 5-15% which may be low in hydrogenated abietyl alcohol, depending upon the conditions of hydrogenation and source of raw material.

The main portion of the hydrogenated Rosinyl alcohol may be distilled under reduced pressure, if desired, to improve its color and remove traces of catalyst, if such be present. During the distillation several cuts of the distillate may be made. The raw material may be hydrogenated to its dihydro- or tetrahydroabietyl compound, or a mixture of the two, prior to reduction to hydrogenated abietyl alcohol. In the event that the unsaturated bonds in the raw materials are not partially hydrogenated in a separate operation, prior to the reduction of the carboxyl group to the alcohol group, the latter procedure normally results in a partial saturation of the unsaturated bonds of the abietyl compound with hydrogen. Thus, methyl abietate will yield dihydroabietyl alcohol.

It is also to be realized that the crude products of the above reactions, comprising mixtures of the various hydrogenated Rosinyl alcohols may be sulphonated in accordance with this invention without substantial purification. For example, a technical grade of hydrogenated abietyl alcohol comprising alcohols of varying degrees of hydrogenation and obtained by hydrogenation as above described of alkyl abietates may be treated in accordance with this invention without further purification. Such technical grades may have a total hydrogenated abietyl alcohol content of about 50%, but desirably for treatment in accordance with this invention will contain from 80-95% hydrogenated abietyl alcohols. The non-alcohol content is probably a $C_{19}$ cyclic hydrocarbon.

The products in accordance with this invention will comprise, depending upon the particular hydrogenated Rosinyl derivative and sulphonating agent employed, various organic base salts of hydrogenated Rosinyl sulphonate and/or sulphates or mixtures thereof. The distinction between the sulphonates and the sulphates is purely technical:

In the sulphonates the linkage to carbon is directly through the sulphur atom. While in the sulphate the linkage is from carbon to oxygen. The process in accordance with this invention, especially where only partially saturated Rosinyl derivatives are employed, may produce organic base salts of mixed sulphonates and sulphates, since there are several reactive positions in the Rosinyl radical besides the position occupied by the functional group and, accordingly, several different reactions with the sulphonating agent may take place. However, since all these organic base salts of the sulphates, sulphonates and mixtures thereof are substantially equivalent in the various uses made of them, they will be referred to hereinafter and in the claims as organic base salts of hydrogenated Rosinyl sulphonation products, which term is meant to include both the organic base salts of the hydrogenated Rosinyl sulphonates, the sulphates and mixtures thereof.

The organic base salts of the sulphonated hydrogenated Rosinyl derivatives produced in accordance with this invention are soluble in petroleum and aromatic hydrocarbons. They are brownish colored solids containing from about 2% to about 16% sulphur and are highly useful as dispersive, emulsifying and wetting-out agents.

The method in accordance with this invention requires no special form of apparatus and includes broadly the treatment in any suitable manner of a hydrogenated Rosinyl derivative with a sulphonating agent and then neutralizing the sulphonation product so formed with an organic base. Thus, for example, the hydrogenated Rosinyl derivative, as an abietyl alcohol, may be slowly added to the sulphonating agent, as for example, concentrated sulphuric acid, with vigorous agitation. The ratio of alcohol to acid may be widely varied, for example, from 1:0.2 to 1:50 parts by weight, and the reaction temperature may be varied within wide limits, for example, from about −20° C. to about 200° C., although a temperature of from about 10° C., to about 40° C. is preferred. The agitation will be continued after the addition of all the alcohol until a test portion of the mixture is completely soluble when dropped into water—about 6 to 20 hours at room temperature. The mixture is then diluted with water while cooled and agitated to give an acid concentration of 30 to 70%. The free sulphonation product will separate as the upper layer on standing and is purified by being dissolved in water, neutralized with an organic base, salted out with, for example, a saturated solution of sodium chloride or sulphate, and dried. Alternately, the free sulphonation product may be washed with a saturated salt solution, such as an aqueous solution of an electrolyte salt, as, sodium chloride, sodium sulphate, etc., and then neutralized with an organic base.

The sulphonated, hydrogenated Rosinyl derivative will ordinarily be neutralized by the addition of an amount of the organic base slightly in excess of the amount theoretically necessary for neutralization. However, when using an organic base to which indicators, such as litmus and the like, are sensitive, the end-point of the neutralization reaction may be determined by the aid of a suitable indicator.

If desired the sulphonating agent, as, for example, fuming sulphuric acid, chlorsulphonic acid, etc. may be added to the hydrogenated Rosinyl derivative, for example, a hydrogenated Rosinyl alcohol, dissolved in a suitable non-reactive solvent, such as ether, petroleum ether hexane, carbon tetrachloride, dichloro ethyl ethyl ether, etc., or in a solvent such as acetic anhydride, glacial acetic acid, etc., which combines with the sulphuric acid to form acetylsulphuric acid, a sulphonating agent. The acid will desirably be added in excess of the amount theoretically necessary and may be added in considerable excess. Where a water immiscible solvent such as carbon tetrachloride is used, and the amount of sulphonating agent employed is not greatly in excess of theoretical, the reaction mixture can be treated with the requisite organic base for neutralization. The solvent may then be removed by distillation at atmospheric or reduced pressure, holding the temperature below about 100° C. to prevent decomposition of salt.

Where either no solvent is employed, or the solvent used is water soluble, such as acetic acid, the reaction mixture can be treated with an excess of a saturated solution of a salt such as, NaCl, Na$_2$SO$_4$, etc., for washing. The viscous sulphonated material may then be neutralized with the organic base.

Drying of the organic base salt will desirably proceed below a temperature of about 100° C. to prevent decomposition.

Where a non-alcohol, hydrogenated Rosinyl derivative, as for example, a hydrogenated Rosinyl halide, is employed, the sulphonating agent will desirably be a sulphite or acid sulphite, as, for example, sodium sulphite, sodium acid sulphite, etc. The hydrogenated Rosinyl halide dissolved in a suitable solvent, as, for example, benzene, xylene, petroleum hydrocarbons, ether, etc. will be treated directly with the sulphite at a suitable temperature, as, for example, from about 10° C. to about 275° C. The use of a neutral sulphite will produce directly the corresponding salt of the sulphonated hydrogenated Rosinyl derivative, while an acid sulphite will produce the usual acidic sulphonation product which will be neutralized with an organic base. If a hydrocarbon solvent is employed, the sulphonation product will separate and can be easily removed. If a solvent in which it is soluble, e. g. ether, CCl$_4$, or the like, is used, the sulphonation product may be readily obtained by evaporation of its solution after its separation from any insoluble salt formed in the neutralization reaction.

The procedure in accordance with this invention for the production of sulphonated hydrogenated Rosinyl derivatives is illustrated in its more specific embodiments by the examples given below:

*Example I*

150 parts by weight of hydrogenated abietyl alcohol were dissolved in 400 parts by weight of carbon tetrachloride and the mixture cooled to about 0° C. The mixture was maintained at this low temperature and 66 parts by weight of chlorsulphonic acid added slowly with rapid stirring over a period of thirty minutes. When the chlorsulphonic acid was added, the resulting reaction mixture was divided into three parts, and neutralized, respectively, with three different organic bases as follows:

One-third of this reaction mixture was neutralized with commercial triethanolamine, which consists of about 75% triethanolamine, 20% diethanolamine, about 5% monoethanolamine and a small amount of water. After neutralization the product was recovered by distilling off the carbon tetrachloride on a steam bath. The small amount of water present is removed along with the carbon tetrachloride. The resulting triethanolamine salt of hydrogenated abietyl sulphonate was a light-colored, pasty mass which was hygroscopic in nature and difficult to dry completely. It was soluble in water, pine oil and petroleum hydrocarbon solvents. It was soluble in pine oil to a somewhat greater extent than the corresponding sodium salt. Solutions of this salt in pine oil gave a suds when shaken with water.

One-third of the sulphonation reaction mixture was neutralized with pyridine. The carbon tetrachloride and water contained therein was then removed by distillation on a steam bath to yield a pasty, hygroscopic product which was soluble in water and petroleum hydrocarbons. This product was the pyridine salt of hydrogenated abietyl sulphonate. The solution of this salt in naphtha gave suds when shaken with water.

One-third of the sulphonation reaction mixture was neutralized with aniline. The carbon tetrachloride and water were removed by distillation on a steam bath to yield a pale-colored, pasty, hygroscopic product which was difficult to dry. This product is the aniline salt of hydrogenated abietyl sulphonate. It is practically insoluble in water, but is soluble in petroleum hydrocarbons. A petroleum hydrocarbon solution gives no appreciable suds when shaken, but will emulsify readily in water.

*Example II*

About 290 g. of hydrogenated abietyl alcohol are slowly added to 500 g. of concentrated H$_2$SO$_4$ at 5–10° C. with vigorous agitation. After the alcohol is added, the mixture is agitated from ½ to 10 hours at room temperature, until substantially complete solubility in water results. The reaction mixture is slowly poured into a mixture of ice and water with agitation and cooling. Sulphonated, hydrogenated abietyl alcohol separates and is washed with several 1000 cc. portions of 12% NaCl solution, then dissolved in about 500 cc. of water and neutralized with about 142 g. of commercial triethanolamine. The triethanolamine salt of hydrogenated abietyl sulphonate is salted from solution by adding about 500–1000 cc.

of 12% NaCl solution, and dried by heating at a temperature below 100° C.

Example III

About 290 g. of hydrogenated abietyl alcohol are mixed with 120 g. of acetic anhydride; to the mixture are slowly added 300 g. of concentrated $H_2SO_4$ with cooling and vigorous agitation. The temperature is held at about 10° C. while introducing the acid. After the acid has been introduced, the agitation is continued at room temperature from ½ to 10 hours until complete water solubility results. The reaction mixture is then poured into a mixture of 500 g. of water and ice, with cooling and agitation. The sulphonated material separates and is washed with several 1000 cc. portions of 12% NaCl solution, then dissolved in about 500 cc. of water and neutralized with about 84 g. of pyridine. The pyridine salt of hydrogenated abietyl sulphonate is salted from solution by adding 500–1000 cc. of 12% NaCl solution and dried by heating at a temperature below 100° C.

Example IV

About 290 g. of hydrogenated abietyl alcohol are dissolved in 600 g. of petroleum ether, and 116 g. of chlorsulphonic acid are added slowly with vigorous agitation while keeping the temperature at 5–10° C. After the acid is added, about 84 g. of pyridine is added with cooling and agitation, and the solvent removed by distillation on the steam bath. The resulting pyridine salt of hydrogenated abietyl sulphonate is dried by heating at a temperature below 100° C.

This application is a continuation-in-part of my copending application Serial No. 715,941, filed March 16, 1934 (now United States Patent No. 2,107,508).

What I claim and desire to protect by Letters Patent is:

1. A salt of an organic nitrogen-containing base and the sulphonation product of a hydrogenated Rosinyl alcohol.
2. A salt of an organic nitrogen-containing base and the sulphonation product of a hydrogenated abietyl alcohol.
3. An aliphatic alkalolamine salt of the sulphonation product of a hydrogenated Rosinyl alcohol.
4. An aliphatic alkalolamine salt of the sulphonation product of a hydrogenated abietyl alcohol.
5. An ethanolamine salt of the sulphonation product of hydrogenated abietyl alcohol.
6. A triethanolamine salt of the sulphonation product of hydrogenated abietyl alcohol.
7. A salt of a heterocyclic nitrogen-containing organic base and the sulphonation product of a hydrogenated Rosinyl alcohol.
8. A pyridine salt of a sulphonated hydrogenated Rosinyl alcohol.
9. A pyridine salt of a sulphonated hydrogenated abietyl alcohol.
10. An aromatic amine salt of the sulphonation product of a hydrogenated Rosinyl alcohol.
11. An aromatic amine salt of the sulphonation product of hydrogenated abietyl alcohol.
12. An aniline salt of the sulphonation product of hydrogenated abietyl alcohol.
13. The method of producing an organic nitrogen-containing base salt of the sulphonation product of a hydrogenated Rosinyl alcohol which includes reacting a Rosinyl alcohol with a sulphonating agent and neutralizing the sulphonated product with an organic nitrogen-containing base.
14. The method of producing an organic nitrogen-containing base salt of the sulphonation product of a hydrogenated Rosinyl alcohol which includes reacting a suitable Rosinyl alcohol and a sulphonating agent in the presence of a solvent for the hydrogenated Rosinyl alcohol, and neutralizing the sulphonated product with an organic nitrogen-containing base.
15. The method of producing an organic nitrogen-containing base salt of the sulphonation product of a hydrogenated Rosinyl alcohol which includes reacting a suitable Rosinyl alcohol and a sulphonating agent in the presence of an inert, water-immiscible solvent, neutralizing the sulphonation product with an organic nitrogen-containing base, and recovering the organic nitrogen-containing base salt of the sulphonated, hydrogenated Rosinyl alcohol by evaporating the said solvent.
16. The method of producing an organic nitrogen-containing base salt of the sulphonation product of a hydrogenated Rosinyl alcohol, which includes reacting a suitable Rosinyl alcohol and a sulphonating agent in the presence of a water-miscible solvent, separating the acidic sulphonation product from the reaction mixture by the addition of a solution of an electrolyte salt, and neutralizing the said acidic sulphonation product with an organic nitrogen-containing base.

ALFRED L. RUMMELSBURG.